350-311

CROSS REFERENCE SEARCH ROOM

178/7.85

Feb. 19, 1963 P. SCHULZ ET AL 3,078,343

TELEVISION RECEIVER COMPRISING AN OPTICAL FILTER

Filed Aug. 8, 1956 3 Sheets-Sheet 1

X2647

Inventors.
Paul Schulz, &
Gerhard Janus.
By [signature] Atty.

TELEVISION RECEIVER COMPRISING AN OPTICAL FILTER

Filed Aug. 8, 1956 3 Sheets-Sheet 2

Inventors.
Paul Schulz, &
Gerhard Janus.
By. [signature] Atty.

TELEVISION RECEIVER COMPRISING AN OPTICAL FILTER

Filed Aug. 8, 1956 3 Sheets-Sheet 3

Inventors.
Paul Schulz, &
Gerhard Janus.
By [signature] Att'y

United States Patent Office 3,078,343

Patented Feb. 19, 1963

3,078,343

TELEVISION RECEIVER COMPRISING AN OPTICAL FILTER

Paul Schulz and Gerhard Janus, Karlsruhe, Germany, assignors to Siemens & Halske Aktiengesellschaft Berlin and Munich, a corporation of Germany Filed Aug. 8, 1956, Ser. No. 602,775
Claims priority, application Germany Oct. 19, 1955
2 Claims. (Cl. 178—7.85)

This invention is concerned with a television receiver provided with an optical filter adapted to pass predominantly only the radiation, having two or more spectral maxima, produced upon the fluorescent layer of the viewing screen which is excited by the electron beam, while weakening radiation of other wave lengths contained in extraneous light, for example, in daylight or in the light from a source employed for room illumination. The transmissibility of the filter layer is for this purpose altered within the range of one of the emission maxima of the fluorescent layer for the purpose of shifting the color tint by a desired amount in the direction of another emission maximum.

The use of an optical filter disposed in a television receiver in front of the viewing screen of the cathode beam tube is broadly known. It has also been proposed to color such a filter for the purpose of improving the contrasts. Daylight or light from a lamp serving to illuminate the room in which the television is viewed impairs the corresponding picture very considerably due to the fact that it produces by scattering and reflection upon the viewing screen interfering light which may cause considerable reduction of contrasts. The contrast may be improved by known negligible neutral gray-coloring of the filter because the interfering light must pass the filter twice and is thereby damped more strongly than the light emanating from the viewing screen which passes the filter only once.

The visible spectrum of the light emanating from customary television picture tubes has two or more maxima which are however placed so as to produce an approximately white light impression. In some television tubes, the picture produced upon the screen appears cold and unpleasant due to a slightly bluish or greenish tint. It has also been found that television receivers producing a coloring of the picture going somewhat in the direction of a yellowish chamois tint are more favorably accepted by the public.

Recent investigations have revealed that a color tint is in the case of a relatively low light level generally experienced as pleasant, if the emphasis thereof is shifted in the direction of longer waves (toward red), while a color tint in the case of more brilliant light is experienced as pleasant if it approximates daylight which in the case of a low light level would appear cold and nearly bluish. The unpleasant impression of a screen producing bluish light becomes understandable upon realizing that the television viewing screen must be considered as a light source with low light level.

It is for the foregoing reasons desirable to give every television owner the possibility of fitting the picture impression to his individual taste, by the use of a suitable light filter, which at the same time improves the contrasts.

This object is realized by the provision of an optical filter exhibiting transmissibility which is altered within the range of one emission maximum for the purpose of shifting the color tint of the picture produced by a desired amount in the direction of another emission maximum so as to cause said filter to pass only the principal radiation while weakening radiation of other wave lengths contained in extraneous light sources. Such a filter may for example produce pictures with a warm tint going in the direction of a chamois tint, provided of course that the corresponding relatively long wave radiation components are contained in the emission spectrum of the screen material.

In accordance with another object and feature of the invention, the filter may be such as to pass only narrow spectral ranges which embrace the emission maximas of the picture screen while strongly damping spectral ranges lying between the emission maxima. Such a filter will improve contrasts particularly effectively. A defined coloring of the television picture may also be produced by relatively negligible shifting the maxima of the filter pass curve with respect to the radiation maxima of the phosphorous.

Relatively strong damping of the spectral ranges lying between the emission maxima of the light emanating from a picture screen is in connection with contrast filters broadly known. As compared therewith, the invention proposes a filter which produces not only an effective improvement of contrasts, but also a color correction of the screen picture which fits the individual taste of the owner of a television receiver.

Undesired scattering of the spectral emission distribution, which occurs in the production of picture tubes, may likewise be compensated by filters according to the invention.

A further advantage of the invention resides in greater freedom in the choice of phosphorous for the picture screen. The emission spectrum of the screen need not be such as to furnish the desired color tint. Accordingly, phosphorous or phosphorous mixtures may be used having slight disturbing relative maxima in their emission spectrum which would otherwise undesirably affect the color tint.

A filter according to the invention may also be mounted in an existing television receiver, or may be provided in the form of a separate transparent plate upon the implosion protection of a receiver or upon the picture tube thereof. It is recommended that the filter plate be made for easy removable mounting in a receiver so as to exchange it for another filter as may be required when exchanging the picture tube for one with different screen properties.

The foregoing and other objects and features of the invention will appear from the description which will be rendered below with reference to the accompanying drawings. In these drawings, FIG. 1 shows as an example a television receiver employing a filter according to the invention;

Figure 1:
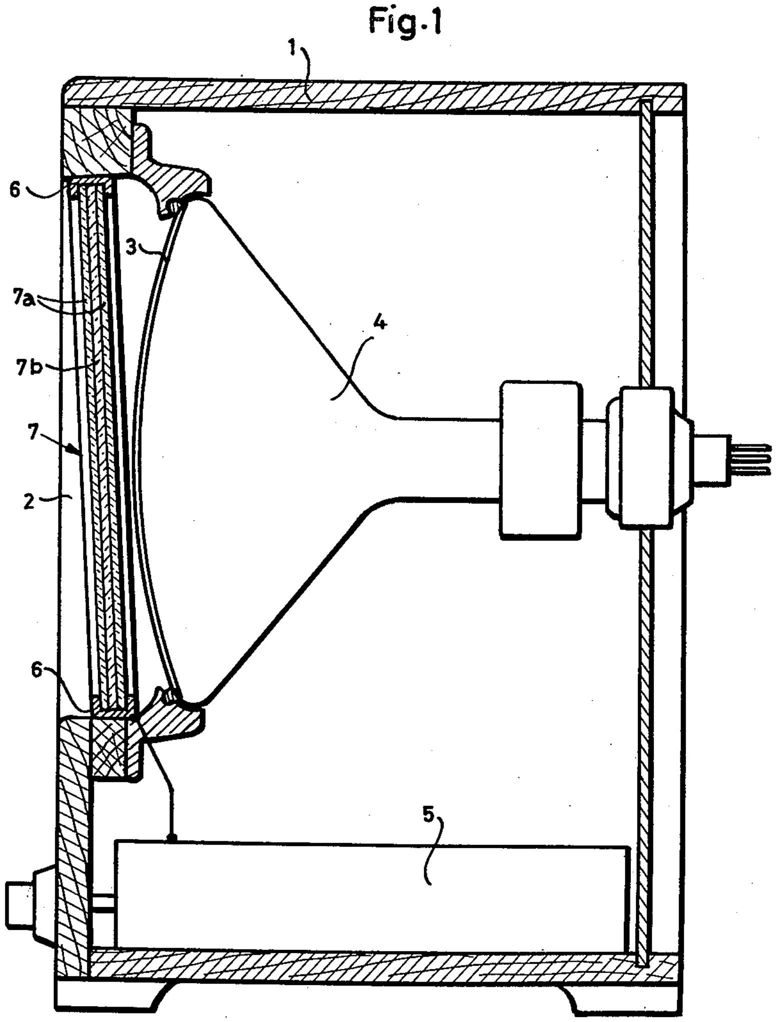

In FIG. 1, numeral 1 designates the housing of a television receiver having an opening 2 through which may be viewed the picture screen 3 of a tube 4. In the opening 2 is disposed a frame 6, slightly inclined to the vertical plane. Mounted in the frame 6 is a filter plate 7 which may be made of laminated safety glass and may also serve as implosion protection. Numeral 7*a* indicates two glass plates and 7*b* indicates the intermediate layer serving to join the glass plates. The intermediate layer 7*b* may be colored in simple manner so as to produce a filter action. It is however also possible to color the glass plates or the surfaces thereof so as to obtain the desired optical filter action. The chassis for mounting the switching elements is indicated at 5.

Figure 2:
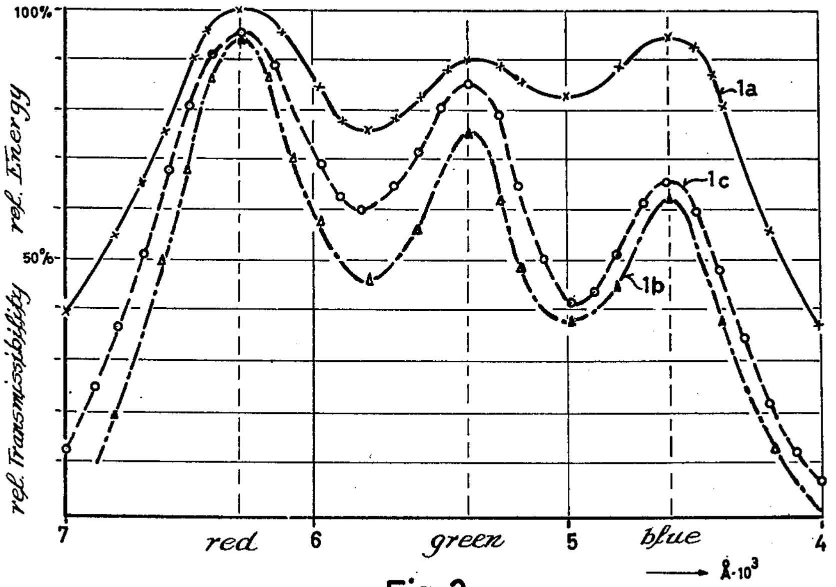
FIG. 2 shows as an example an emission spectrum of a picture screen, having three maxima.

FIG. 2 shows as an example an emission spectrum 1*a* of a picture screen, which has three maxima. In order to obtain a color shifting according to curve 1*b*, there will suffice a filter having a pass curve 1*c*. In addition to the color shifting, there will also result an improvement in contrasts. The relative energy and the relative transmissibility are plotted on the ordinate.

Figure 3:
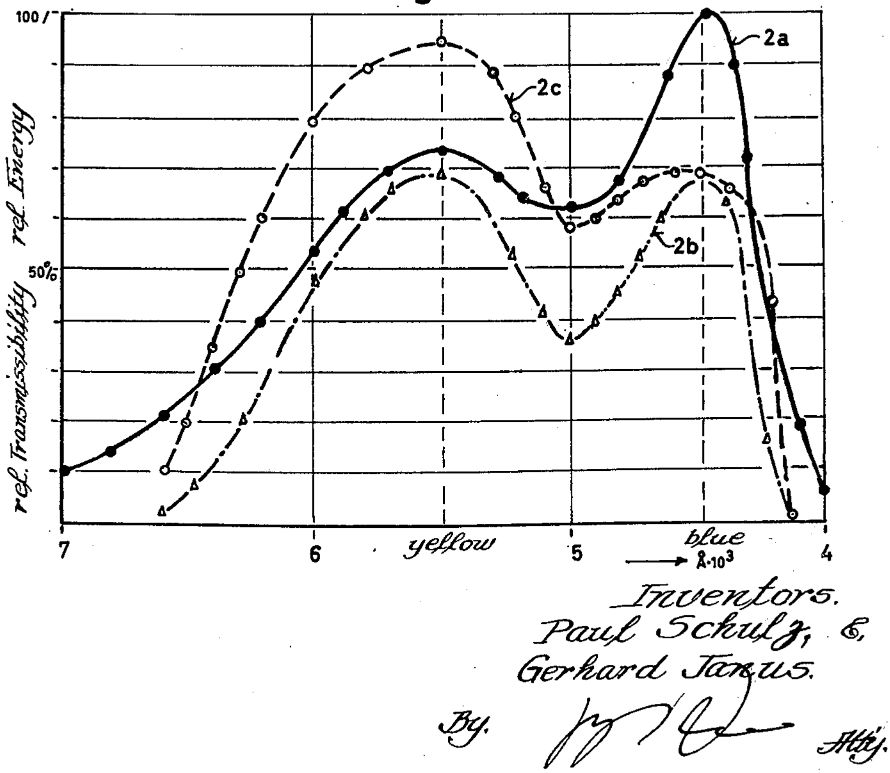
FIG. 3 shows an emission spectrum with two complementary emission maxima.

FIG. 3 shows the emission spectrum of a tube with two complementary emission maxima 2*a*. The color impression may be altered and contrast may at the same time be improved, by considerably shifting one maximum, for example, blue, in accordance with curve 2*b*. This is achieved by providing a filter having a transmissibility curve according to 2*c*.

Figure 4:
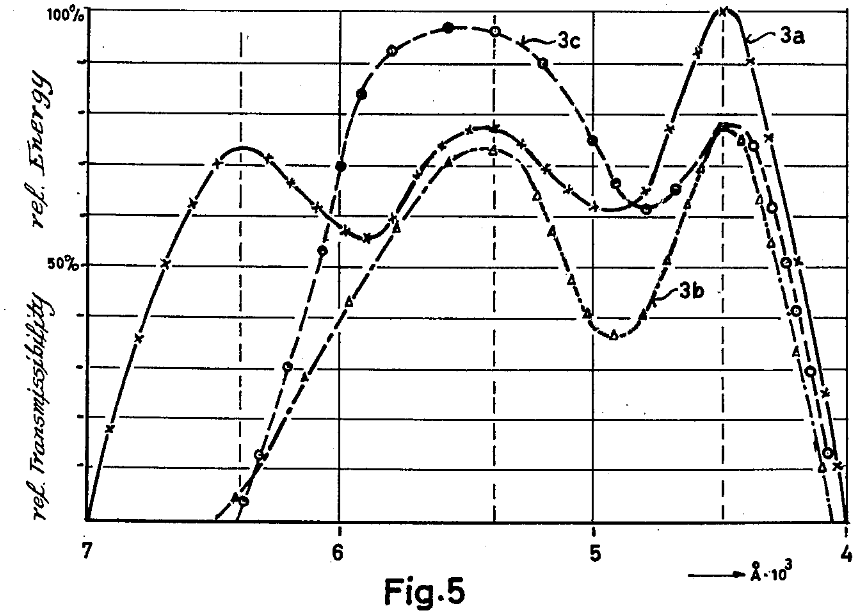
FIG. 4 shows how a neighboring maximum may be suppressed by the use of a filter curve.

The emission curves of some phosphorous may contain next to the principal maxima smaller relative maxima which may cause an undesired color impression on the picture screen. It is possible, by means of a filter having a curve 3*c*, shown in FIG. 4, to suppress a neighboring relative maximum for phosphorous with an emission curve 3*a* while at the same time improving the contrasts. Curve 3*b* represents the spectrum of the filtered radiation.

Figure 5:
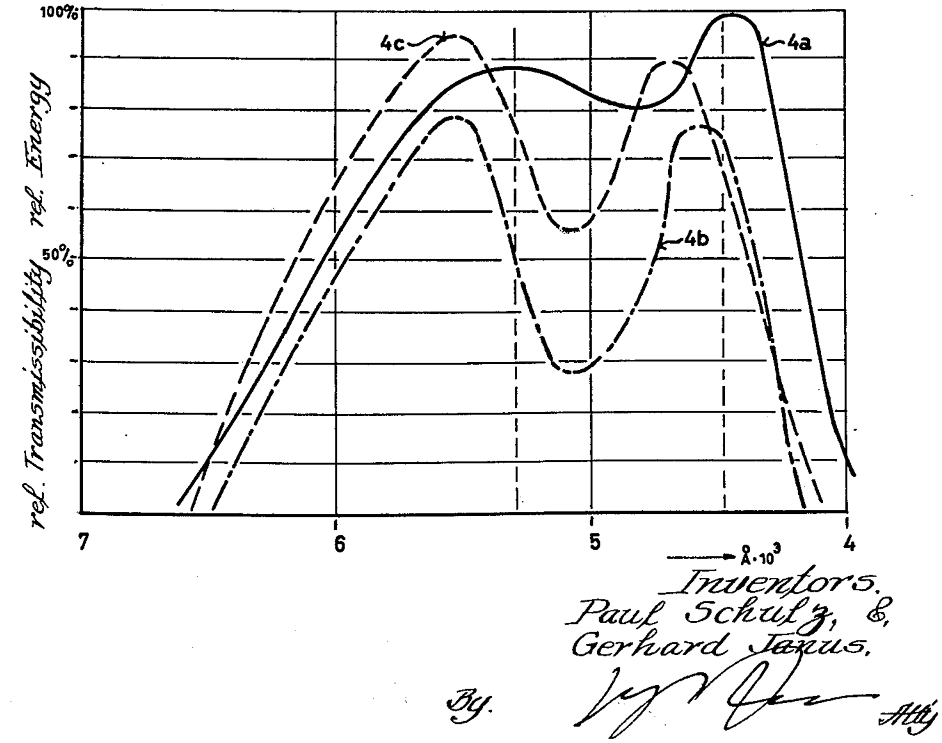
FIG. 5 shows how a color correction of the screen light may be obtained by shifting a transmission maximum.

FIG. 5 illustrates how the color of the screen light may be corrected by suitable shifting of a transmissibility maximum of the filter curve. The spectral course of light emission of a picture screen is indicated at 4*a*. By using, for example, a filter with a transmissibility or pass course according to curve 4*c*, there will be obtained a spectrum of the filtered radiation according to curve 4*b* and, accordingly, a picture without disturbing bluish tint.

Changes may be made within the scope and spirit of the appended claims.

We claim:

1. For use in connection with a television receiver having a picture tube and a viewing screen producing a principal radiation with at least two principal spectral maxima excited upon the associated fluorescent layer of said viewing screen by the electron beam of the tube, an optical filter disposed in the path of radiation emanating from said screen and constructed to pass predominantly the wavelengths of said principal radiation of said fluorescent screen while weakening radiation of other wavelengths and radiation contained in extraneous light sources impinging upon said screen, said filter having a transmissibility characteristic including a maximum generally corresponding to a spectral maximum of said screen but occurring at a wavelength displaced therefrom whereby the transmissibility of said filter effects within the wavelength of one emission maximum shifting of the color tint for a desired amount in the direction of another emission maximum.

2. An optical filter according to claim 1 which passes only narrow spectral ranges lying in the zones of the emission maxima of the viewing screen while strongly damping spectral ranges lying between said emission maxima.

References Cited in the file of this patent

UNITED STATES PATENTS

| | | |
|---|---|---|
| 2,420,168 | Dimmick | May 6, 1947 |
| 2,494,992 | Ferguson | Jan. 17, 1950 |
| 2,567,713 | Kaplan | Sept. 11, 1951 |
| 2,644,854 | Sziklai | July 7, 1953 |
| 2,655,452 | Barnes | Oct. 13, 1953 |
| 2,690,554 | Wolf | Sept. 28, 1954 |
| 2,706,139 | Jabczenski | Apr. 12, 1955 |
| 3,009,017 | Conner et al. | Nov. 14, 1961 |
| 3,013,114 | Bridges | Dec. 12, 1961 |